United States Patent
Flodman et al.

(10) Patent No.: US 10,724,391 B2
(45) Date of Patent: Jul. 28, 2020

(54) ENGINE COMPONENT WITH FLOW ENHANCER

(71) Applicant: General Electric Company, Schenectady, NY (US)

(72) Inventors: David Allen Flodman, Rowley, MA (US); Robert Francis Manning, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/481,935

(22) Filed: Apr. 7, 2017

(65) Prior Publication Data

US 2018/0291752 A1  Oct. 11, 2018

(51) Int. Cl.
  *F01D 5/18* (2006.01)
  *F01D 9/06* (2006.01)

(52) U.S. Cl.
  CPC ............. *F01D 9/065* (2013.01); *F01D 5/187* (2013.01); *F05D 2250/23* (2013.01); *F05D 2250/231* (2013.01); *F05D 2250/75* (2013.01); *F05D 2260/2212* (2013.01)

(58) Field of Classification Search
  None
  See application file for complete search history.

(56) References Cited

U.S. PATENT DOCUMENTS

| | | | | |
|---|---|---|---|---|
| 4,236,870 A | * | 12/1980 | Hucul, Jr. | F01D 5/187 415/115 |
| 4,265,275 A | * | 5/1981 | Heller | F28F 1/40 138/38 |
| 4,474,532 A | * | 10/1984 | Pazder | F01D 5/187 415/115 |
| 5,165,852 A | | 11/1992 | Lee et al. | |
| 5,328,331 A | * | 7/1994 | Bunker | F01D 5/187 415/115 |
| 5,395,212 A | * | 3/1995 | Anzai | F01D 5/187 415/115 |
| 5,484,258 A | * | 1/1996 | Isburgh | F01D 5/187 415/115 |
| 5,538,394 A | * | 7/1996 | Inomata | F01D 5/187 415/115 |
| 5,738,493 A | * | 4/1998 | Lee | F01D 5/187 416/97 R |
| 5,797,726 A | * | 8/1998 | Lee | F01D 5/187 416/96 R |
| 6,402,470 B1 | * | 6/2002 | Kvasnak | F01D 5/187 415/115 |

(Continued)

OTHER PUBLICATIONS

Chinese Patent Office, Office Action re Chinese Application No. 201810300083.4, dated Jan. 17, 2020, 6 pages, China.

*Primary Examiner* — Peter J Bertheaud
*Assistant Examiner* — Geoffrey S Lee
(74) *Attorney, Agent, or Firm* — McGarry Bair PC (57) ABSTRACT

An apparatus and method relating to an airfoil for a turbine engine and cooling channels within the airfoil. The airfoil includes an outer wall defining an interior bound by a pressure side and a suction side extending axially between a leading edge and a trailing edge defining a chord-wise direction and extending radially between a root and a tip defining a span-wise direction. Further, the airfoil includes ribs located within the interior and a flow enhancer extending between the ribs.

27 Claims, 5 Drawing Sheets

(56) References Cited

U.S. PATENT DOCUMENTS

| | | | |
|---|---|---|---|
| 6,514,042 B2 * | 2/2003 | Kvasnak | F01D 5/187 415/115 |
| 6,595,748 B2 * | 7/2003 | Flodman | F01D 5/186 415/115 |
| 6,981,840 B2 | 1/2006 | Lee et al. | |
| 7,527,474 B1 * | 5/2009 | Liang | F01D 5/186 416/1 |
| 7,530,789 B1 | 5/2009 | Liang | |
| 7,544,044 B1 * | 6/2009 | Liang | F01D 5/188 416/96 R |
| 7,549,843 B2 * | 6/2009 | Liang | F01D 5/186 415/115 |
| 7,611,330 B1 | 11/2009 | Liang | |
| 7,661,930 B2 * | 2/2010 | Deschamps | F01D 5/187 416/97 R |
| 7,955,053 B1 * | 6/2011 | Liang | F01D 5/187 415/115 |
| 8,303,252 B2 * | 11/2012 | Piggush | B22C 9/10 416/97 R |
| 8,511,968 B2 * | 8/2013 | Liang | F01D 5/187 415/115 |
| 8,562,295 B1 | 10/2013 | Liang | |
| 8,894,363 B2 * | 11/2014 | Lee | F01D 5/186 415/175 |
| 8,944,763 B2 | 2/2015 | Lee | |
| 9,017,027 B2 * | 4/2015 | Campbell | F01D 5/183 416/97 R |
| 9,022,736 B2 | 5/2015 | Lee et al. | |
| 9,366,143 B2 * | 6/2016 | Lee | F01D 5/186 |
| 9,920,635 B2 * | 3/2018 | Bommisetty | F01D 5/188 |
| 2003/0026698 A1 | 2/2003 | Flodman et al. | |
| 2011/0038735 A1 | 2/2011 | Liang et al. | |
| 2015/0377029 A1 * | 12/2015 | Blake | F01D 5/18 416/232 |
| 2016/0069194 A1 * | 3/2016 | Bommisetty | F01D 5/187 416/96 R |
| 2018/0291752 A1 | 10/2018 | Flodman et al. | |

\* cited by examiner

ENGINE COMPONENT WITH FLOW ENHANCER

BACKGROUND OF THE INVENTION

Turbine engines, and particularly gas or combustion turbine engines, are rotary engines that extract energy from a flow of combusted gases passing through the engine onto a multitude of rotating turbine blades.

Turbine engines for aircraft, such as gas turbine engines, are often designed to operate at high temperatures to maximize engine efficiency, so cooling of certain engine components, such as the high-pressure turbine and the low-pressure turbine, can be beneficial. Typically, cooling is accomplished by ducting cooler air from the high and/or low-pressure compressors to the engine components that require cooling. Temperatures in the high-pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine components, such as airfoils, can include one or more interior cooling circuits for routing the cooling air through the airfoil to cool different portions of the airfoil, and can include dedicated cooling circuits for cooling different portions of the airfoil, such as the leading edge, trailing edge, or tip.

BRIEF DESCRIPTION OF THE INVENTION

In one aspect, the present disclosure relates to an airfoil for a turbine engine, the airfoil comprising an outer wall defining an interior bound by a pressure side and a suction side extending axially between a leading edge and a trailing edge defining a chord-wise direction and extending radially between a root and a tip defining a span-wise direction, at least two ribs located within the interior and extending between the pressure side and the suction side, and arranged in spaced relationship to at least partially define a cooling passage within the interior, and a flow enhancer extending between the at least two ribs and spaced from the pressure side and suction side.

In another aspect, the present disclosure relates to an engine component for a turbine engine, the engine component comprising an outer wall defining an interior bound by a pressure side and a suction side extending axially between a leading edge and a trailing edge defining a chord-wise direction and extending radially between a root and a tip defining a span-wise direction, at least two ribs located within the interior and extending between the pressure side and the suction side, and arranged in spaced relationship to at least partially define a cooling passage within the interior, and a flow enhancer extending between the at least two ribs and spaced from the pressure side and suction side.

In yet another aspect, the present disclosure relates to a method of increasing the speed of a flow of cooling fluid at a cooling passage in a component for a turbine engine having an outer wall and a camber line central to the component, the method comprising flowing air along outer walls of the cooling passage and around a flow enhancer extending between a pair of spaced interior walls spanning between the outer walls.

DESCRIPTION OF EMBODIMENTS OF THE INVENTION

The described embodiments of the present invention are directed to a component for a turbine engine. For purposes of illustration, the present invention will be described with respect to an airfoil for an aircraft gas turbine engine. It will be understood, however, that the invention is not so limited and may have general applicability within an engine, including compressors, as well as in non-aircraft applications, such as other mobile applications and non-mobile industrial, commercial, and residential applications. Additionally, the aspects will have applicability outside of an airfoil, and can extend to any engine component requiring cooling, such as a blade, vane, or shroud, in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e. g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
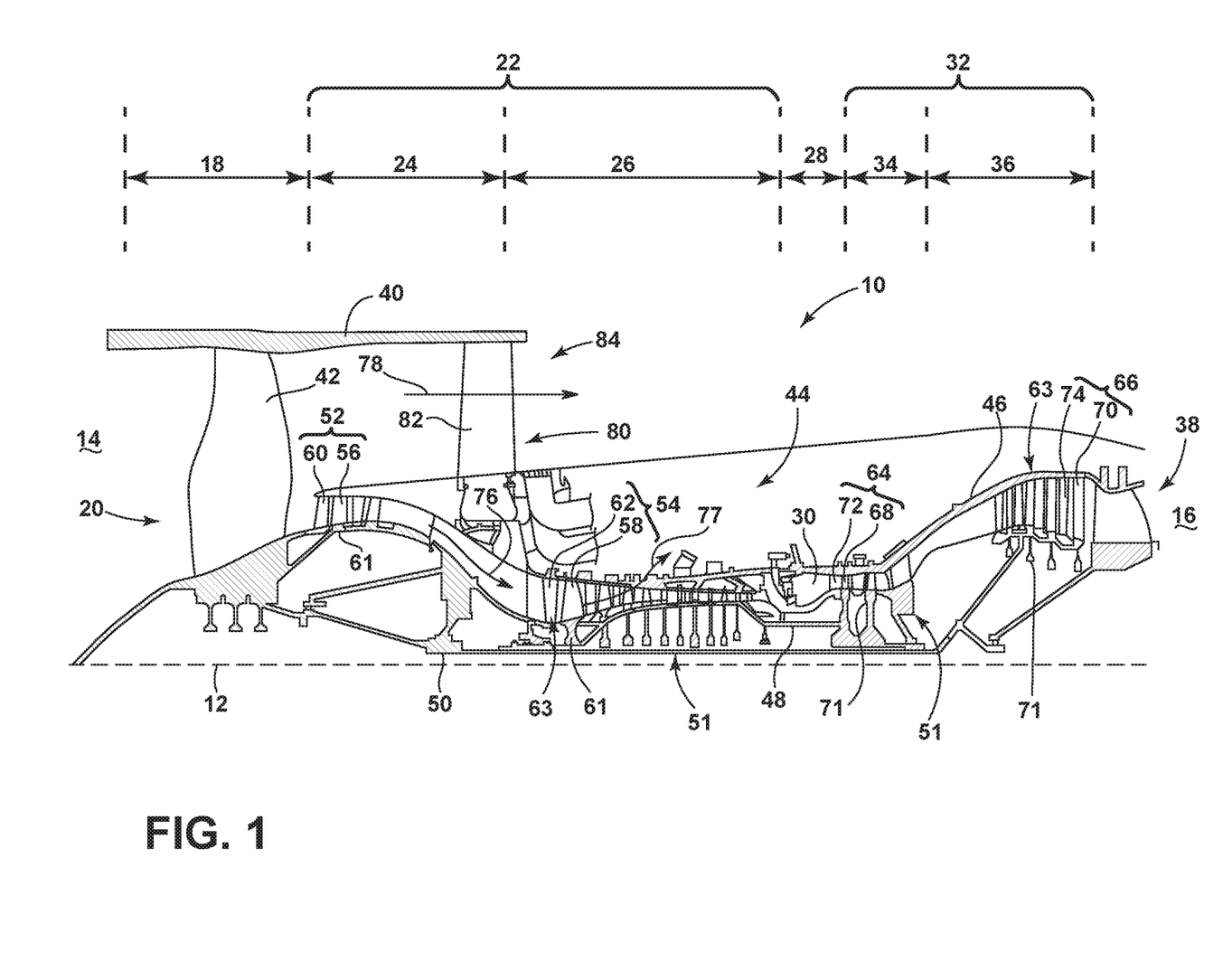
FIG. 1 is a schematic cross-sectional diagram of a turbine engine for an aircraft.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
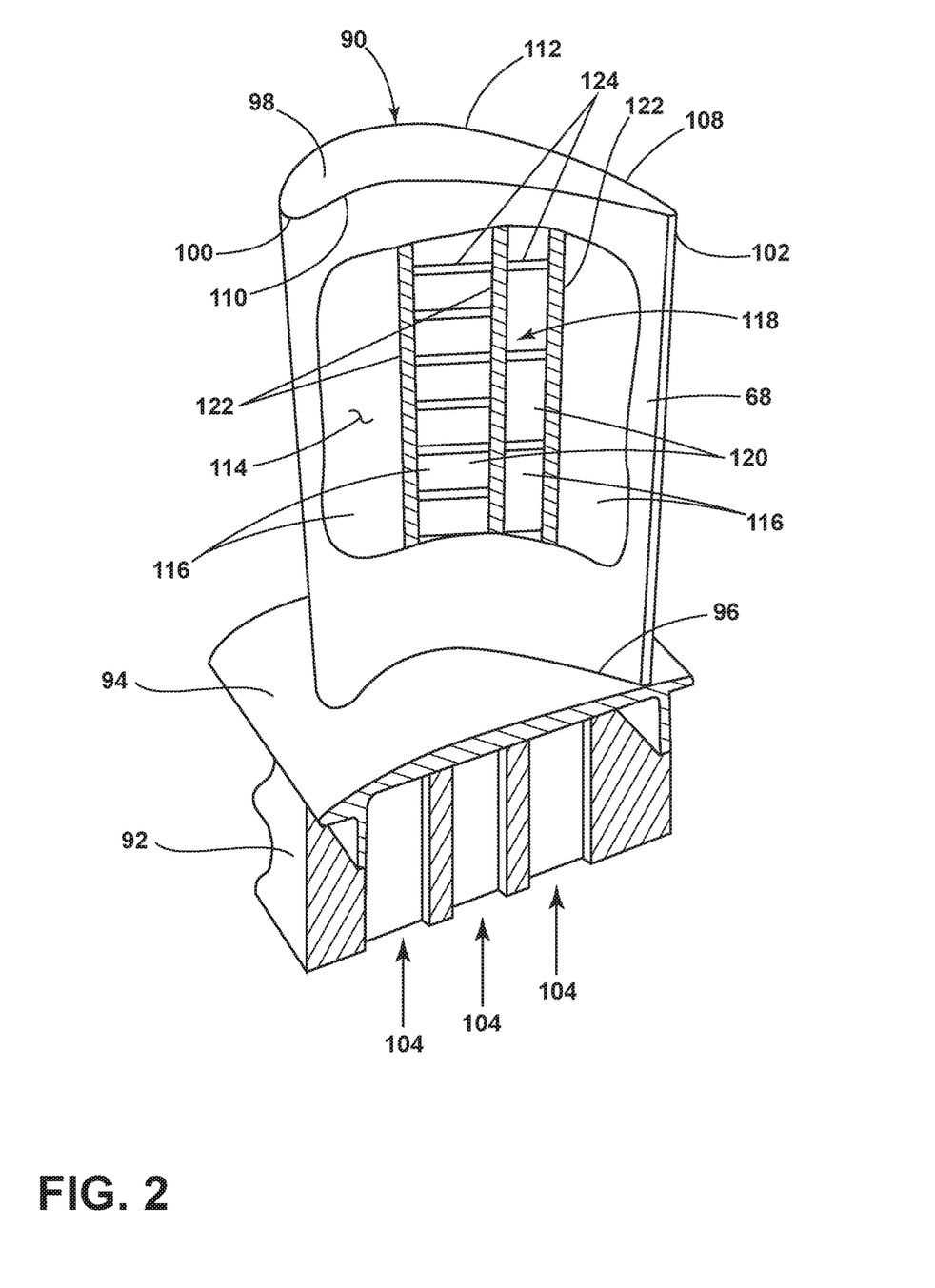
FIG. 2 is a partially-sectioned, perspective view of an airfoil of the turbine engine of FIG. 1 with airflow passages within the airfoil.

Referring now to FIG. 2, an engine component is shown in the form of an airfoil 90, which can be one of the turbine blades 68 of the engine 10 of FIG. 1 for example. Alternatively, the engine component can include a vane, or portions of a shroud in non-limiting examples, or any other engine component that can require or utilize cooling passages. The airfoil 90 includes a dovetail 92 and a platform 94. The airfoil 90 extends radially between a root 96 and a tip 98 defining a span-wise direction. The airfoil 90 extends axially between a leading edge 100 and a trailing edge 102 defining a chord-wise direction. The dovetail 92 can be integral with the platform 94, which can couple to the airfoil 90 at the root 96. The dovetail 92 can be configured to mount to a turbine rotor disk on the engine 10. The platform 94 helps to radially contain the turbine airflow. The dovetail 92 comprises at least one inlet passage 104, shown as three exemplary inlet passages 104, each extending through the dovetail 92 in fluid communication with the airfoil 90. It should be appreciated that the dovetail 92 is shown in cross-section, such that the inlet passages 104 are housed within the dovetail 92.

The airfoil 90 includes an outer wall 108 having a pressure side 110 and a suction side 112 extending between the leading edge 100 and the trailing edge 102. An interior 114 of the airfoil 90 is defined by the outer wall 108.

Multiple cooling passages 116 extend within the interior 114 from the root 96 toward the tip 98 and are at least partially defined by the outer wall 108. The cooling passages 116 can define one or more cooling circuits 118 throughout the airfoil 90.

The cooling passages 116 can include at least one inner cooling passage 120, shown as two exemplary inner cooling passages 120. The at least one inner cooling passage 120 is defined in part by at least two ribs 122, shown as three exemplary ribs 122, extending in the span-wise direction.

The inner cooling passages 120 can include at least one flow enhancer 124 arranged such that it is angled between 0 and 80 degrees, shown at an exemplary 0 degrees, with respect to a plane orthogonal to the span-wise direction which in the illustration is substantially parallel to the platform 94. The angle will influence the frictional drop associated with the at least one flow enhancer 124 and the relative chord-wise heat transfer enhancement to the pressure side 110 and the suction side 112. The inner cooling passages 120 can include a different number of flow enhancers 124 as illustrated. The multiple flow enhancers 124 by way of non-limiting example can be turbulators, fastback turbulators, pin fins, pin banks, or vortex generators. It is contemplated that the flow enhancers 124 can be arranged in any formation and are not necessarily uniform or similar in their orientation. Each flow enhancer 124 extends between the at least two ribs 122 such that each flow enhancer 124 is spaced from both the pressure side 110 and the suction side 112 of the outer wall.

Figure 3:
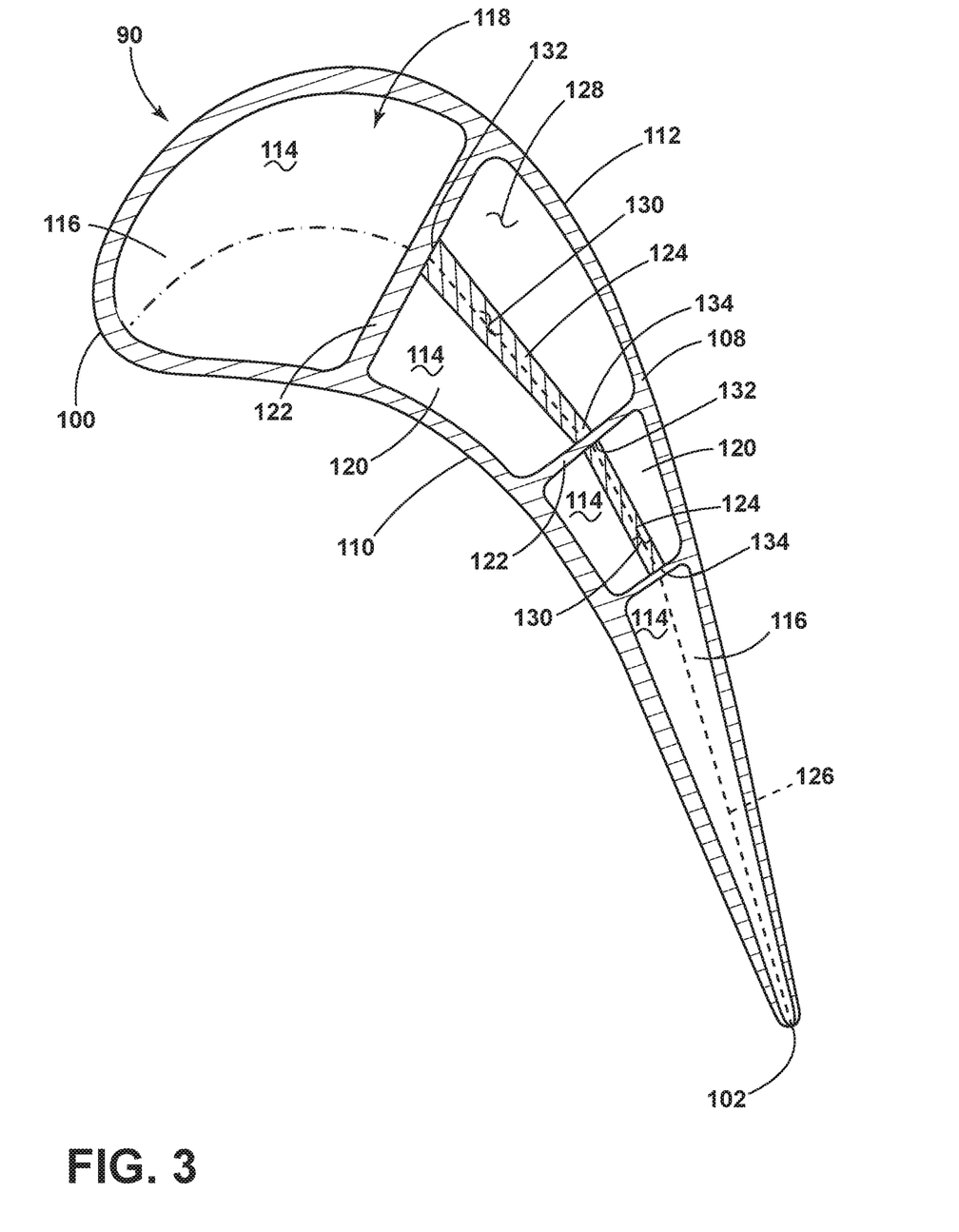
FIG. 3 is a cross-sectional view of the airfoil of FIG. 2 illustrating airflow passages defined by ribs and flow enhancers.

Turning to FIG. 3, a cross-section of the airfoil 90 illustrates at least four exemplary cooling passages 116 including the exemplary inner cooling passages 120. A camber line 126 extends from the leading edge 100 to the trailing edge 102 halfway between the pressure side 110 and the suction side 112 of the airfoil 90. While illustrated as two inner cooling passages 120, it should be appreciated that multiple inner cooling passages or a single inner cooling passage can also be contemplated.

The at least one flow enhancer 124, shown as two exemplary flow enhancers 124, extends along the camber line 126 between the at least two ribs 122. The at least one flow enhancer 124 is located such that the cross-sectional area 128 of the inner cooling passage 120 and in turn the volume of the inner cooling passage 120 decreases in comparison to an inner cooling passage 120 without a flow enhancer 124.

The ribs 122 are interior walls such that the flow enhancers 124 extend between interior walls. It should be appreciated that while the at least one rib can be multiple ribs 122 illustrated as extending in the substantially span-wise direction, defining substantially span-wise extending passages 116, the ribs 122 can be organized in any direction, such as axial, radial, span-wise, chord-wise, or any combination thereof in non-limiting examples as long as they comprise interior walls. As such, the passages or any portion of the cooling circuit 118 defined by the passages 116 can extend in any three-dimensional direction.

The cooling passages 116 can define the cooling circuits 118 throughout the airfoil 90. Additionally, the cooling circuits 118 can further include micro-circuits, sub-circuits, near wall cooling circuits, leading edge passages, trailing edge passages, pin fins, pin banks, additional passages 116, flow augmentation structures, or any other structures which can define the cooling circuits.

The inner cooling passages 120 include the at least one flow enhancer 124 spanning the inner cooling passage 120. The exemplary flow enhancer 124 includes a body 130 with opposing ends 132, 134. Each opposing end 132, 134 is mounted to the at least two ribs 122 such that the cross-sectional area 128 of the inner cooling passage 120 is divided along the camber line 126 for the chord-wise sectional plane of the corresponding inner cooling passage.

It is further contemplated that the opposing ends 132, 134 mount to the at least two ribs 122 such that the flow enhancer 124 is spaced from the outer wall 108 and does not run along the camber line 126 while still dividing the cross-sectional area 128 into two parts. The position of the flow enhancer 124 is not limited and relatively closer to the suction side 112 or to the pressure side 110 while still remaining spaced from the outer wall 108.

Figure 4:
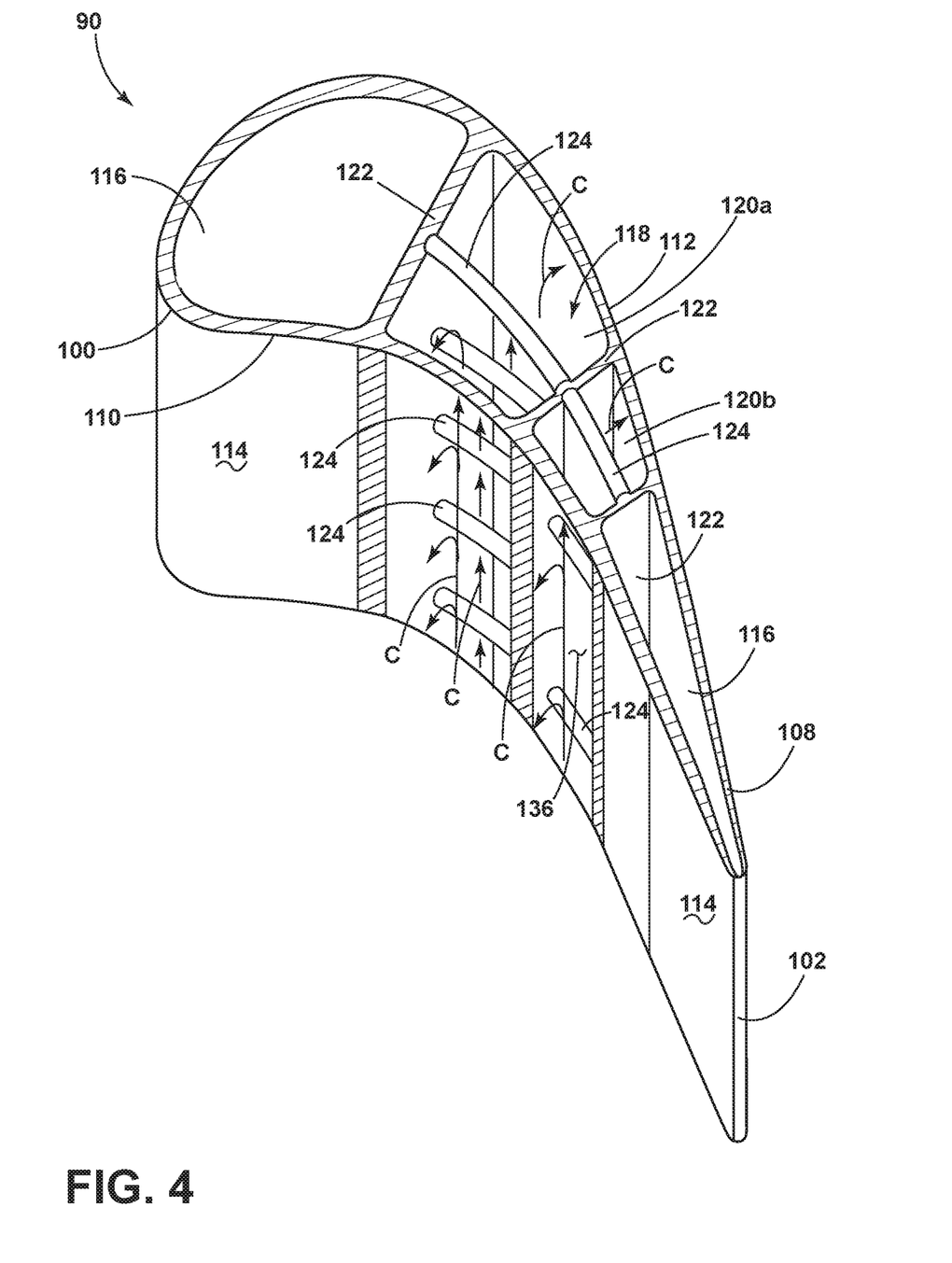
FIG. 4 is a perspective view of a portion of the airfoil of FIG. 2 with outer walls cut away for illustrating the flow enhancers within the airflow passages.

A perspective view of the airfoil 90 with a portion of the outer wall 108 cut away to illustrate the flow enhancers 124 within is illustrated in FIG. 4. One of the inner cooling passages 120a is depicted with more flow enhancers 124 than the other inner cooling passage 120b. A method of increasing the speed of a flow of cooling fluid, by way of non-limiting example a cooling air C, in the inner cooling passages 120a, 120b includes flowing the cooling air C along the outer walls 108 of the inner cooling passages 120a, 120b and around the flow enhancers 124. Placement of the flow enhancers 124 decreases a net volume of each inner cooling passage 120a, 120b when compared to the cooling passage 116 without flow enhancers 124. A decrease in volume of the inner cooling passages 120a, 120b can increase the speed of the cooling air C when flowing through the inner cooling passages 120a, 120b. An increase in flow velocity of the cooling air C through the inner cooling passages 120a, 120b contributes to improving the distribution of cooling air C in the inner cooling passages 120a, 120b and can also increase a heat transfer coefficient at the outer wall 108. The flow enhancer 124 locally increases the flow velocity due to a local decreased cross-sectional area. The flow enhancer 124 also creates more flow turbulence by disturbing the developing or fully developed channel flow. The net result is a more chaotic/turbulent flow condition with a thinner boundary layer and an enhanced heat transfer coefficient relative to a standard channel flow. The volume of the inner cooling passages 120a, 120b can create a speed of cooling air C having a local Mach number of between 0.05 and 0.4.

Extending the flow enhancers 124 between ribs 122, prevents the flow enhancers 124 from unwanted heat transfer from the outer walls 108 due to conduction. This enables the flow enhancers 124 to remain relatively cooler than the outer walls 108. The outer walls 108 are typically at a higher temperature than the ribs 122. In turn relatively cooler flow enhancers 124 prevent unnecessary heat transfer from the flow enhancer 124 to the cooling air C within the inner cooling passages 120a, 120b.

When cooling air C comes in contact with the flow enhancers 124 the cooling air C can be pushed from the center of the inner cooling passages 120a, 120b towards the outer walls 108. When cooling air C flows along the outer walls 108 or is pushed towards the outer walls 108, heat pick up within the cooling air C increases. The location at which the flow enhancer 124 is placed increases the amount of cooling air C along the outer wall 108, which in turn also contributes to increasing the heat transfer coefficient of the outer wall 108.

Strategic placement and location of the flow enhancers 124 within the inner cooling passages 120a, 120b enables managing areas of cooling within the airfoil 90. Spacing flow enhancers 124 to create intentional spaces 136, illustrated in cooling passage 120b as larger than in cooling passage 120a, can decrease the speed of the cooling air C within the cooling passage 120b compared to the cooling passage 120a. Likewise the amount of heat pick up in the cooling air C in inner cooling passage 120b is comparatively less than that to the cooling air C in inner cooling passage 120b. In this way, placement of the flow enhancers 124 controls the speed of the cooling air C within the inner cooling passages 120a, 120b and manages the amount of heat pick up within the cooling air C in the respective inner cooling passages 120a, 120b.

In doing so, the flow enhancers can be located to better balance the blade metal temperature distribution for improved durability. It should be understood that the size of the spaces 136 are dependent on the required cooling for the airfoil 90 and cooling circuit 118. By way of non-limiting example, it is contemplated that one of the inner cooling passages 120a has more flow enhancers 124 than cooling passage 120b. It should be understood that the number of flow enhancers 124 located within the inner cooling passages 120a, 120b can vary, and can even be zero.

Figure 5A:
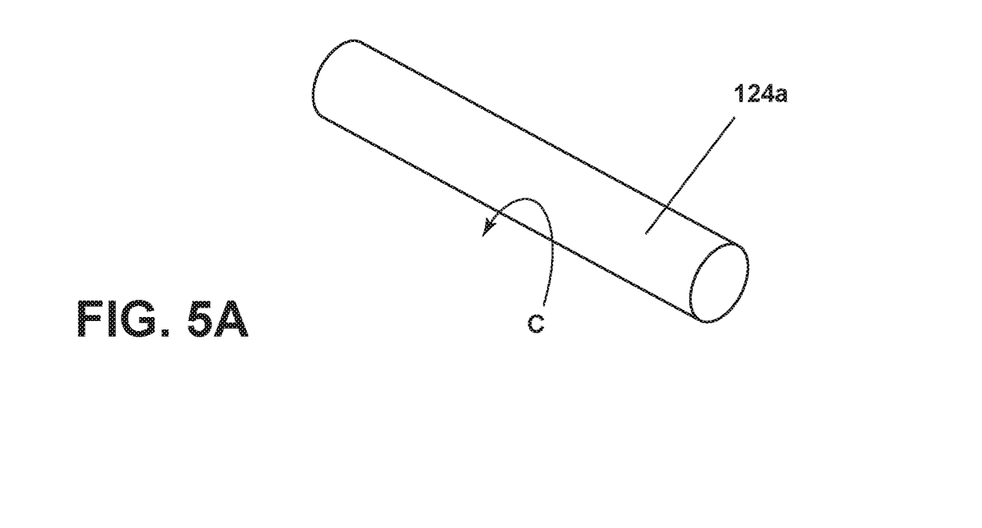
FIG. 5A is a perspective view of an exemplary flow enhancer according to aspects of the disclosure described herein.
Figure 5B:
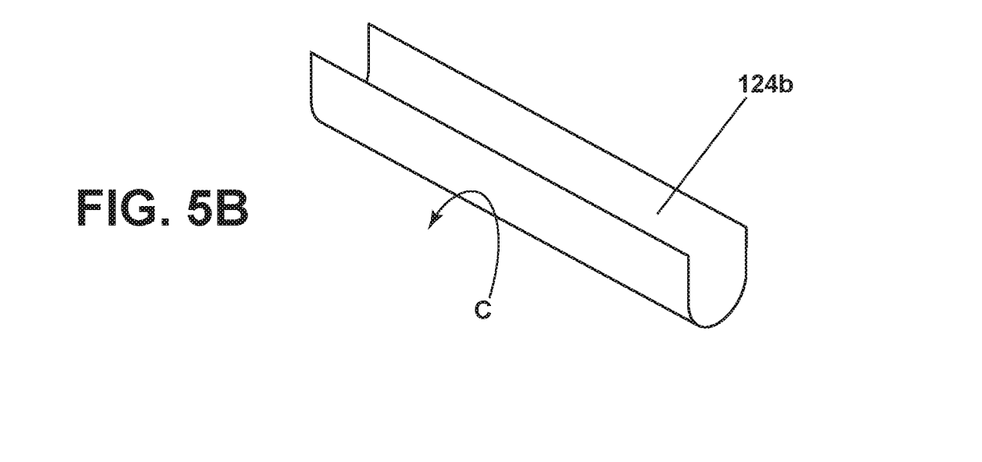
FIG. 5B is a perspective view of a second exemplary flow enhancer according to aspects of the disclosure described herein.
Figure 5C:
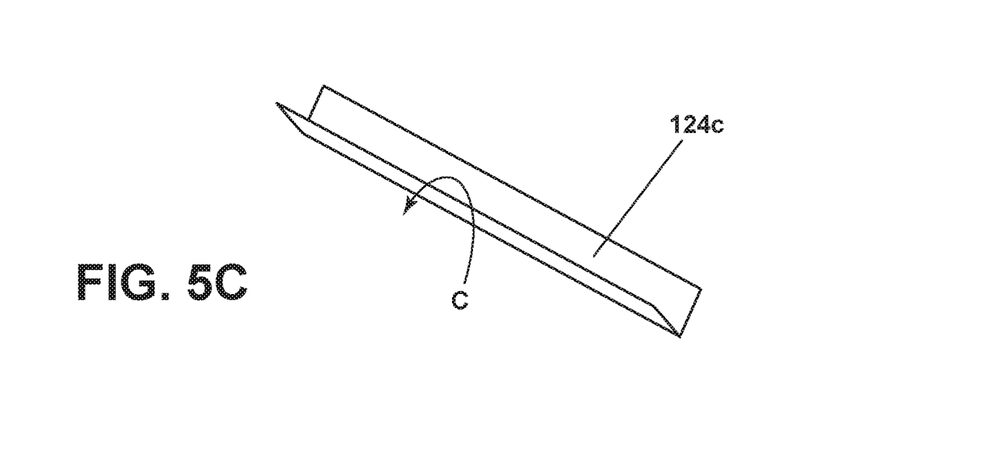
FIG. 5C is a perspective view of a third exemplary flow enhancer according to aspects of the disclosure described herein.

The flow enhancers 124 can be, for example but not limited to hollow, porous, or partially hollow. FIG. 5A is a cylindrical shaped flow enhancer 124a where cooling air C deflects away from the flow enhancer 124a towards the outer wall 108 much like those depicted in FIG. 4. FIG. 5B shows an alternative C-shape flow enhancer 124b where the rounded edge of the C-shape can be facing the cooling air C to direct the cooling air C towards the outer wall 108. Another alternative shape is a flow enhancer 124c with V-shape where the apex of the V faces the cooling air C. The shape and porosity of the illustrated flow enhancers 124a, 124b, 124c is for example only and not meant to be limiting.

Turbine components such as blades, vanes and shrouds are exposed to extremely hot gas path temperatures that result in the components requiring internal cooling. Often cooling flow is not adequate and heat transfer enhancement features are required to improve cooling effectiveness. Heat transfer enhancement features include pins, dimples, bumps, and flow enhancers. These features enhance turbulence in the cooling circuit resulting in higher heat transfer coefficients on the cavity walls. Controlling the speed of the cooling air within cooling passages and in turn where the heat transfer coefficient is increased effectively manages the cooling air C to more effectively cool engine components discussed herein.

Changing the orientation of the flow enhancers 124 from a traditional orientation where they span from the pressure side 110 to the suction side 112 to spanning between interior ribs 122 along the camber line 126 achieves a desired increase in heat transfer for the pressure side 110 and the suction side 112 without increasing heat transfer from the flow enhancers 124 to the cooling air C. The interior ribs 122 are cooler than the outer wall 108 and mounting the flow enhancers 124 to the ribs 122 rather than along the outer wall 108 optimizes the distribution of air within the inner cooling passage 120 without any additional heat pickup from areas near the outer wall 108. This is especially beneficial for areas of the airfoil 90 where managing of heat pickup is necessary and cooler air can be delivered where needed.

The flow enhancers 124 increase Mach numbers when compared to an inner cooling passage 120 without the flow enhancers 124 by reducing the cross-sectional area within the inner cooling passage 120. An increase in the Mach number results in a greater heat transfer coefficient at the outer wall and better distribution of the air within the passage. This increase in the speed of the air within the inner cooling passage 120 is achieved while minimizing heat pickup to the moving air from the flow enhancers 124. The flow enhancer 124 also creates more flow turbulence by disturbing the developing or fully developed channel flow. The net result is a more chaotic/turbulent flow condition with a thinner boundary layer and an enhanced heat transfer coefficient relative to standard channel flow.

The flow enhancers as described herein are especially beneficial in small engine stage two nozzles having low pressure side to suctions side widths. These small engines also have lower overall core flow through the engine leaving very little air for cooling the nozzles. At such low flows, low internal Mach numbers result in poor distribution of flow within the cavity and non-uniform cooling. The flow enhancers as described herein can increase Mach numbers while preventing heat pickup which enables more efficient cooling.

It should be appreciated that while the description is directed toward an airfoil, the concepts as described herein can have equal applicability in additional engine components, such as a vane, shroud, or combustion liner in non-limiting examples, and flow enhancers within the passage of the airfoil can be any similar region of any engine component having a cooling circuit, or an interior cooling surface with a wall separating the hot gas flow and requiring cooling, such as regions typically requiring film cooling holes or multi-bore cooling.

It should be appreciated that application of the disclosed design is not limited to turbine engines with fan and booster sections, but is applicable to turbojets and turbo engines as well, or any other engine requiring fluid cooling.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
   an outer wall defining an interior bound by a pressure side and a suction side extending axially between a leading edge and a trailing edge defining a chord-wise direction and extending radially between a root and a tip defining a span-wise direction;
   at least two ribs located within the interior and extending between the pressure side and the suction side, and arranged in spaced relationship to at least partially define a cooling passage within the interior; and
   at least one flow enhancer extending between opposing ends with each opposing end mounted to the at least two ribs such that the at least one flow enhancer is unattached at all remaining surfaces of the flow enhancer and spaced from the pressure side and suction side.

2. The airfoil of claim 1 comprising the at least two ribs extending along the pressure side and suction side in a span-wise direction.

3. The airfoil of claim 2 wherein the at least one flow enhancer is multiple flow enhancers extending between the at least two ribs and spaced in a span-wise direction.

4. The airfoil of claim 3 wherein the multiple flow enhancers are aligned in the span-wise direction.

5. The airfoil of claim 1 wherein at least two ribs comprise multiple ribs spaced in the chord-wise direction and at least partially defining multiple cooling passages spaced in the chord-wise direction.

6. The airfoil of claim 5 wherein the at least one flow enhancer comprises multiple flow enhancers extending between the at least two ribs and located within the multiple cooling passages.

7. The airfoil of claim 6 wherein at least some of the multiple flow enhancers are arranged in a chord-wise direction.

8. The airfoil of claim 6 wherein at least some of the multiple flow enhancers are arranged along a camber line in the chord-wise direction.

9. The airfoil of claim 1 wherein the at least one flow enhancer extends along a camber line axially central to the airfoil.

10. The airfoil of claim 1 wherein the at least one flow enhancer is angled between 0 and 80 degrees with respect to a plane orthogonal to the span-wise direction.

11. An engine component for a turbine engine, the engine component comprising:
    an outer wall defining an interior bound by a pressure side and a suction side extending axially between a leading edge and a trailing edge defining a chord-wise direction and extending radially between a root and a tip defining a span-wise direction;
    at least two ribs located within the interior and extending between the pressure side and the suction side, and arranged in spaced relationship to at least partially define a cooling passage within the interior; and
    a flow enhancer extending between opposing ends with each opposing end mounted to the at least two ribs such taht the flow enhancer is unattached at all remaining surfaces of the flow enhancer and spaced from the pressure side and suction side.

12. The engine component of claim 11 comprising the at least two ribs extending along the pressure side and suction side in a span-wise direction.

13. The engine component of claim 12 further comprising multiple flow enhancers extending between the at least two ribs and spaced in a span-wise direction.

14. The engine component of claim 13 wherein the multiple flow enhancers are aligned in the span-wise direction.

15. The engine component of claim 11 wherein at least two ribs comprise multiple ribs spaced in the chord-wise direction and at least partially defining multiple cooling passages spaced in the chord-wise direction.

16. The engine component of claim 15 wherein the flow enhancer comprises multiple flow enhancers extending between the at least two ribs and located within the multiple cooling passages.

17. The engine component of claim 16 wherein at least some of the multiple flow enhancers are arranged in a chord-wise direction.

18. The engine component of claim 16 wherein at least some of the multiple flow enhancers are arranged along a camber line in the chord-wise direction.

19. The engine component of claim 11 wherein the flow enhancer extends along a camber line axially central to the engine component.

20. The engine component of claim 11 wherein the flow enhancer is angled between 0 and 80 degrees with respect to a plane orthogonal to the span-wise direction.

21. A method of increasing a speed of a flow of cooling fluid at a cooling passage in a component for a turbine engine having an outer wall and a camber line central to the component, the method comprising:
    flowing an airflow along outer walls of the cooling passage and around a flow enhancer extending between a pair of spaced interior walls spanning between the outer walls; and
    limiting heat transfer from the outer alls to the flow enhancer by mounting opposing ends of the flow enhancer to the pair of spaced interior walls such that the flow enhancer is unattached at all remaining surfaces of the flow enhancer and spaced from the outer walls.

22. The method of claim 21 further comprising achieving a Mach number of between 0.05 and 0.4 for the speed of the airflow.

23. The method of claim 21 further comprising increasing a heat transfer coefficient of the outer wall.

24. The method of claim 21 further comprising pushing air from the flow enhancer towards the outer walls.

25. The method of claim 21 further comprising controlling the speed of the airflow within the cooling passage.

26. The method of claim 21 further comprising managing cooling of the cooling passage.

27. The method of claim 21 further comprising spacing the flow enhancer between the outer walls along the camber line.

* * * * *